Figure 1:
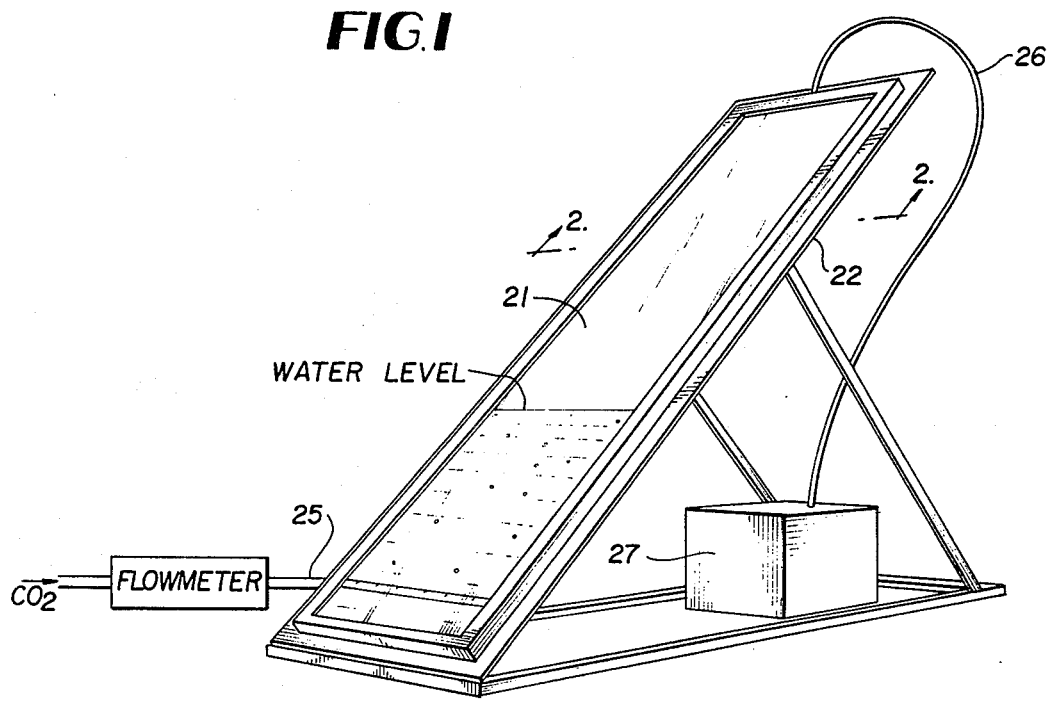

United States Patent [19]

Halmann et al.

[11] Patent Number: 4,478,699
[45] Date of Patent: Oct. 23, 1984

[54] PHOTOSYNTHETIC SOLAR ENERGY COLLECTOR AND PROCESS FOR ITS USE

[75] Inventors: Martin M. Halmann; Mira Ulman, both of Rehovot; Benedict Aurian-Blajeni, Rishon Lezion, all of Israel

[73] Assignee: Yeda Research & Development Co., Ltd., Rehovot, Israel

[21] Appl. No.: 256,399

[22] Filed: Apr. 22, 1981

[30] Foreign Application Priority Data

May 9, 1980 [IL] Israel .......................................... 60033

[51] Int. Cl.³ ............................................. B01J 19/12
[52] U.S. Cl. .................................. 204/158 R; 422/186
[58] Field of Search .................... 204/157.1 W, 158 R, 204/129; 250/527

[56] References Cited

U.S. PATENT DOCUMENTS 3,925,212 12/1975 Tcherner ...................... 204/157.1 R
4,211,620 7/1980 Fowler ................................ 204/129
4,219,392 8/1980 Halmann ........................... 204/158 R Primary Examiner—Howard S. Williams
Attorney, Agent, or Firm—Browdy and Neimark

[57] ABSTRACT

A device for the photosynthetic reduction of carbon dioxide and water by sunlight to formic acid, formaldehyde and methanol in the presence of semiconducting photoactive materials. Using preferred compositions of photoactive materials, selected from oxides and sulfides of copper, iron, molybdenum, ruthenium, lead, titanium, and from mixtures of any of these, and from barium titanate, calcium titanate, and strontium titanate, this photochemical solar collector also achieves photothermal energy conversion, thus providing the energy required for continuous distillation and recovery of the above organic materials produced.

12 Claims, 2 Drawing Figures

U.S. Patent Oct. 23, 1984 4,478,699

PHOTOSYNTHETIC SOLAR ENERGY COLLECTOR AND PROCESS FOR ITS USE

BACKGROUND OF THE INVENTION

The present invention relates to a device for the photosynthetic reduction of carbon dioxide and water by sunlight to formic acid, formaldehyde and methanol in the presence of simiconducting photoactive materials.

STATE OF THE PRIOR ART

In U.S. Pat. No. 4,219,392 there has been claimed a process for converting carbon dioxide or bicarbonate ion by reduction to organic compounds selected from alcohols, aldehydes and carboxylic acids of 1 to 2 C atoms, which comprises carrying out the reduction in a photoelectrochemical cell wherein the cathode is a p-type semiconductor, at least part of the energy of reduction being supplied by light.

The decomposition of water by light energy is photoelectrochemical cells into hydrogen and oxygen was first described by Honda and Fujishima, Nature 238, 37 (1972), using n-type semiconductors as photoanodes, while using an inert electrode such a platinum as a cathode. Nozik in Applied Physics Letters 29, 150 (1976) and U.S. Pat Nos. 4,001,149 and 4,090,933 disclosed photoelectrolysis systems including p-type semiconductors as photocathodes and n-type semiconductors as photoanodes, which enable the splitting of water by sunlight without requiring an external electric bias potential. Also, Nozik in U.S. Pat. No. 4,904,751 discloses photochemical diodes for converting water into hydrogen and oxygen, or for splitting water into hydrogen and oxygen, or for splitting hydrogen sulfide into hydrogen and sulfur. Jarett, Kung and Sleight in U.S. Pat. No. 4,144,147 describe a photoelectrolysis cell for splitting of water, using rhodate p-type semiconductor as cathode and an n-type semiconductor or metal as anode. Schrauzer and Guth in U.S. Pat. No. 4,113,590 described formation of ammonium and hydrazine by ultraviolet irradiation of titanium oxide powder in contact with nitrogen and water vapor. Steinberg in U.S. Pat. No. 3,959,094 discloses the electrolysis of aqueous potassium carbonate to produce methanol. Due to the high electric potential required, this process would require a considerable input of energy. Hemminger, Carr and Somorjai in Chemical Physics Letter 57, 100 (1978) describe the photassisted reaction of gaseous water and carbon dioxide adsorbed on single crystal strontium titranate to form methane. However, no practical device for carrying out this process was disclosed.

DESCRIPTION OF THE INVENTION

Solar collectors are widely used for converting the radiation of sunlight into useable heat, particularly for heating water or buildings. The present invention involves a modification of solar collectors. It uses the ultraviolet and visible spectrum of solar radiation for carrying out a chemical reaction, the photosynthetic conversion of carbon dioxide and water over certain photoactive materials into useful organic compounds, particularly formic acid, methanol and formaldehyde. The present invention describes a device for carrying out the above reaction, using the photosynthetic process disclosed in our U.S. Pat. No. 4,219,392.

In addition, the present invention discloses improvements in the above process, for enhancing the efficiency of conversion of carbon dioxide and water into methanol, formaldehyde and formic acid. The reaction can be carried out both in gas-solid phase and in liquid-solid phase.

Figure 2:
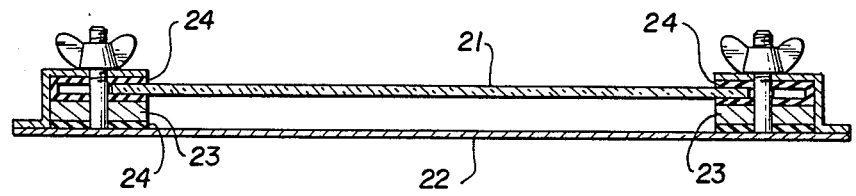

FIG. 1 is a perspective view of the device,

FIG. 2 is a sectional view of the assembly of the collector. The dimensions given in the following description are in metric units and are those of the prototype device built and tested. All the dimensions are described for illustration only, and are not to be taken in a limiting sense. Also, other materials of construction may be used. Thus, instead of the glass plate, plastic sheets transparent to visible and or near ultraviolet light may be used. Instead of aluminium for the base plate, frames, retaining bracket, spacer and tubings, other metals, plastic materials or wood may be used.

The device, as illustrated in FIG. 2, consists of a window-glass plate 21 ($1 \times 0.5 m^2$ area; 3 mm thick), separated from an aluminium base-plate 22 ($1.08 \times 0.58 m^2$ area; 1.2 mm thick) by a spacer 23 (of outer dimensions $1.005 \times 0.505 m^2$). As spacer serves a 10 mm thick, 20 mm wide rectangular aluminium profile. Foam-rubber linings 24 (about 1 mm thick) serve as gaskets (sealants) between the base-plate and the spacer and between the spacer and the glass-plate. The retaining bracket (outer dimensions $1.02 \times 0.5 m^2$; 25 mm wide) is clamped on top of the assembly and tightened with screws to the base-plate. A gas-inlet tube 25 (5 mm inner diameter aluminium tubing) enters through the bottom of the spacer, and extends horizontally through the collector space. This inlet tube is perforated with 0.5 mm diameter holes at 2 cm intervals along its length. The gas-outlet tube 26 (5 mm inner diameter aluminium tubing) leads to a glass or metal cold trap 27, optimally kept at 0° C., for collecting the distillate, a mixture of methanol, formaldehyde and water. Temperatures in the collector space of the device are measured by a thermometer inserted in a well, an aluminium tube welded into the spacer frame. The back side of the base-plate was thermally insulated by a 1 cm thick layer of polystyrene foam.

In the following illustrative examples, all parts and percentages are by weight and all temperatures are degrees centigrade.

EXAMPLE 1

Powdered cuprous oxide was activated by heating at 1000° C. for six hours under vacuum ($10^{-3}$ mm torr). After cooling down under vacuum to room temperature, the powder (25 g) was ground with half that amount of water in a mortar to make a thin paste, which was painted onto the aluminium base-plate. After drying for several minutes in the sun, the photchemical collector was assembled, as shown in FIG. 1, by mounting the foam-rubber linings, spacer, glass-plate and retaining bracket, and by connecting the products trap to the gas-outlet. The collector was at 45° to the vertical as shown in FIG. 1 and faced south direction. Water (0.5 liter) was introduced through the gas inlet tube, and a constant flow of carbon dioxide (400 ml/min) was then introduced, bubbling through the water layer. Under such conditions, the reaction was essentially between the illuminated solid phase of cuprous oxide and a gaseous phase of carbon dioxide and water. Maximal temperature in the gas phase during a cloudy winter day reached 40° C., and on a sunny summer day reached 65° C. This temperature was sufficient to enable the distillation of the formaldehyde and methanol produced in the photochemical reactor, thus serving also for photochemical energy conversion, providing for continuous distillation of the volatile products as they are formed. The light flux was monitored continuously by a pyranometer, the output of which was connected to an integrator to measure the accumulated light dose. The illuminated reaction area was 0.44 m$^2$. After accumulating an integrated light dose of 670 Watt hour in this area, the amounts of methanol and formaldehyde collected were 17.7 and 0.14 micromoles, respectively. This corresponds to an efficiency of conversion of solar energy (total incident energy) to chemically stored energy (heat of combustion of the organic products) of $5.4 \times 10^{\times 4}$ percent.

EXAMPLE 2

A run was carried out as in Example 1, but the photochemical collector was loaded with 3.5 liter of water, covering an area of 0.18 m$^2$. Under these conditions, the reaction was substantially at liquid-solid phases. After accumulating an integrated light dose of 244 Watt hour in this 0.18 m$^2$ area, the amounts of methanol and formaldehyde produced were 280 and 140 micromoles, respectively, corresponding to a solar to chemical conversion efficiency of $3.2 \times 10^{-2}$ percent.

EXAMPLE 3

A run was carried out as in Example 2, but instead of cuprous oxide, the photoactive surface was a mixture of cuprous oxide (15 parts) and ruthenium oxide (2 parts). The photochemical collector was loaded with 4.8 liter of water. After a light dose of 787 Watt hour in the 0.26 m$^2$ illuminated liquid-covered area, the amounts of methanol and formaldehyde were 1540 and 520 micromoles, respectively, corresponding to a solar to chemical conversion efficiency of $5.0 \times 10^{-2}$ percent.

EXAMPLE 4

A run was effected as in Example 1, but instead of cuprous oxide, the photoactive surface was lead tetraoxide, $Pb_3O_4$, activated by heating at 300° C. for 7½ hours under vacuum. After accumulating a light dose of 940 Watt hour, the amounts of methanol and formaldehyde were 1.2 and 0.5 micromoles, respectively, corresponding to a $10^{-5}$ percent conversion efficiency.

EXAMPLE 5

A run was carried out as in Example 2, but instead of cuprous oxide, the photoactive surface was strontium titanate, activated by heating at 1100° C. for 9 hours under vacuum. The photochemical collector was loaded with 1 liter of water. After an irradiation of 200 hours, and an accumulated light dose of 1385 Watt hour, the amounts of formic acid, formaldehyde and methanol produced were 233, 10 and 132 micromoles, respectively, corresponding to a $5.2 \times 10^{-3}$ percent solar to chemical conversion efficiency.

EXAMPLE 6

A run was carried out as in Example 5, but instead of strontium titanate, the photoactive surface was ferric oxide, $Fe_2O_3$, activated by heating at 1180° C. for six hours under vacuum. After a light dose of 1,220 Watt hours, the amounts of methanol and formaldehyde were 120 and 144 micromoles, respectively, corresponding to a $2.2 \times 10^{-2}$ percent conversion efficiency.

EXAMPLE 7

A run was carried out as in Example 5, but instead of strontium titanate, the photoactive surface was molybdenum disulfide, $MoS_2$. After a light dose of 2,180 Watt hours, the amounts of methanol and formaldehyde produced were 900 and 72 micromoles, respectively, corresponding to a $8.8 \times 10^{-3}$ percent conversion efficiency.

EXAMPLE 8

A run was carried out as in Example 5, but instead of strontium titanate, the photoactive surface was calcium titanate, activated by heating at 600° C. for six hours under vacuum. After a light dose of 5070 Watt hour, the amounts of methanol and formaldehyde were 5640 and 350 micromoles, respectively, corresponding to a $2.4 \times 10^{-2}$ percent conversion efficiency.

EXAMPLE 9

A run was carried out as in Example 5, but instead of strontium titanate, the photoactive surface was titanium oxide, activated by heating at 600° C. for seven hours under vacuum. The photochemical reaction was loaded with 1 liter of 0.1 M lithium carbonate. After a light dose of 642 Watt hour, the amounts of formic acid, formaldehyde and methanol were 230, 11 and 10 micromoles, respectively, corresponding to a $6 \times 10^{-3}$ percent conversion efficiency.

We claim:

1. A device for the utilization of light energy to convert carbon dioxide and water of formic acid, methanol and formaldehyde, comprising a solar energy collector having a solar energy facing surface of a ground powder photoactive material inclined at an angle from the horizontal to define a lower end and an upper end, means for maintaining in said collector a layer of water adjacent said photoactive surface to a predetermined level, means for introducing carbon dioxide into said device adjacent said lower end, and means for removing the products of the reaction adjacent said upper end.

2. A device according to claim 1, wherein said means for maintaining a layer of water adjacent said photoactive surface comprises a transparent wall extending generally parallel to said photoactive surface and spaced apart therefrom a distance equal to the thickness of the water layer.

3. A device according to claim 2, wherein said layer of water maintaining means is adapted to maintain the thickness of the water layer from 2 to 20 mm.

4. A device according to claim 1 or 3, wherein the photoactive material is selected from an activated layer of an oxide and sufide of copper, iron, molybdenum, ruthenium, lead, titanium strontium, barium and calcium, and from mixtures of any of these, and from calcium titanate and strontium titanate.

5. A device according to claim 4, wherein the photoactive material is selected from activated copper oxide, iron oxide, ruthenium oxide, titanium oxide, lead tetraoxide, calcium and strontium titanate and a mixture of any of these, and from molybdenum sulfide.

6. A device according to claim 3 wherein said photoactive material surface constitutes a coating of said photoactive material on a facing surface of a metal plate, the opposite surface of said metal plate carrying means to insulate said metal plate.

7. A process for the utilization of solar energy for the conversion of water and carbon dioxide to formic acid, formaldehyde and methanol, which comprises providing a solar energy collector having a surface of a photoactive material inclined at an angle from the horizontal to define a lower end and an upper end, and having a means for maintaining in the collector a layer of water adjacent the photoactive surface to a predetermined level;

passing a stream of carbon dioxide as bubbles through water adjacent said photoactive layer while said photoactive layer is irradiated with solar radiation to effect conversion of said water and said carbon dioxide to formic acid, formaldehyde and methanol.

8. A process according to claim 7, wherein the photoactive layer is selected from layers of activated oxides or sulfides of copper, iron, ruthenium, molybdenum, lead, titanium, strontium, barium and calcium, from mixtures of any of these, and from an alkaline earth titanate selected from calcium and strontium titanate.

9. A device for utilization of solar energy for conversion of water and carbon dioxide to formic acid, formaldehyde and methanol, comprising a plate having a photoactive surface of large surface area and inclined at an angle from the horizontal;

means to form a thin water layer adjacent at least a portion of said photoactive surface;

means to form a stream of carbon dioxide;

means to bubble said stream of carbon dioxide through said water layer adjacent said photoactive surface; and means to pass sunlight through said water to said photoactive surface and thereby effect solar irradiation of said photoactive surface.

10. A device according to claim 1 or 3 or 9 further comprising cold trap means for condensing products of the reaction removed from the upper end of said device.

11. A combination photochemical solar collector and photo thermal energy converter, comprising means for the utilization of light energy to convert carbon dioxide and water to formic acid, methanol and formaldehyde, including a solar energy collector having a surface of a photoactive material inclined at an angle from the horizontal to define a lower end and an upper end and no electrical circuitry, means for maintaining in said collector a layer of water adjacent said photoactive surface to a predetermined level, means for introducing carbon dioxide into said device adjacent said lower end, means for removing vapors of formic acid, formaldehyde and methanol adjacent said upper end, and means for condensing said vapors including a cold trap.

12. A device according to claim 11 wherein said photoactive material is coated directly over a metal plate.

* * * * *